United States Patent
Takeda et al.

(10) Patent No.: US 6,424,774 B1
(45) Date of Patent: Jul. 23, 2002

(54) TUNABLE WAVELENGTH FOUR LIGHT WAVE MIXER

(75) Inventors: Shinichi Takeda; Shigeki Watanabe, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/456,821

(22) Filed: Dec. 8, 1999

(30) Foreign Application Priority Data

Dec. 18, 1998 (JP) .......................................... 10-361589

(51) Int. Cl.[7] ................................................ G02B 6/00
(52) U.S. Cl. ...................... 385/122; 385/24; 359/154; 359/160; 359/183
(58) Field of Search ............................ 385/1, 2, 3, 122, 385/123, 124, 125, 126, 147, 24; 359/154, 160, 161, 162, 174, 180, 181, 183

(56) References Cited

U.S. PATENT DOCUMENTS

| | | | | |
|---|---|---|---|---|
| 5,532,868 A | * | 7/1996 | Gnauck et al. | 359/332 |
| 5,798,853 A | * | 8/1998 | Watanabe | 359/160 |
| 5,920,588 A | * | 7/1999 | Watanabe | 359/124 |
| 6,124,960 A | * | 9/2000 | Garthe et al. | 359/181 |
| 6,263,139 B1 | * | 7/2001 | Kawakami et al. | 385/123 |

FOREIGN PATENT DOCUMENTS

| | | |
|---|---|---|
| JP | 3171787 | 7/1991 |
| JP | 784289 | 3/1995 |

* cited by examiner

*Primary Examiner*—Cassandra Spyrou
*Assistant Examiner*—Euncha Cherry
(74) *Attorney, Agent, or Firm*—Staas & Halsey LLP (57) ABSTRACT

A tunable wavelength four light wave mixer using at least a dispersion-shifted optical fiber and having a larger freedom in the wavelength of the converted light is disclosed. The mixer comprises at least a dispersion-shifted optical fiber supplied with signal light of wavelength $\lambda_s$ from an input optical fiber 14 and with pump light of wavelength $\lambda p$ from a pump light source 12 through a wave multiplexing unit 15. The dispersion-shifted optical fiber is configured with a plurality of sequentially connected dispersion-shifted optical fibers 11-1, 11-2 of different zero dispersion wavelengths $\lambda_{o1}, \lambda_{o2}$. The pump light source 12 outputs the pump light of the same wavelength $\lambda_{p1}$ or $\lambda_{p2}$ as one of a plurality of different zero dispersion wavelengths $\lambda_{o1}, \lambda_{o2}$. The converted light of wavelength $\lambda_c (=\lambda_{c1}$ or $\lambda_{c2})$ is output from an optical bandpass filter (BPF) 13.

35 Claims, 6 Drawing Sheets

Fig.1

PRIOR ART

TUNABLE WAVELENGTH FOUR LIGHT WAVE MIXER

BACKGROUND OF THE INVENTION

1. Field of the Invention

The present invention relates to a tunable wavelength four light wave mixer for converting the wavelength of a signal light.

2. Description of the Related Art

A light wavelength multiplex transmission system is finding applications in which a plurality of signal light of different wavelengths are multiplexed and transmitted through a single optical fiber. In this wavelength multiplex transmission system, it is desired to exchange information between different wavelengths and to convert the wavelength of the light signal without photoelectric conversion.

With the increase in the band of light amplifiers, a network having a different wavelength band is expected to appear. In such a case, wavelength conversion without photoelectric conversion is desired. Further, the long-distance transmission of light signals poses the problem of waveform distortion generated by wavelength dispersion and the nonlinear optical effect of the optical fiber. A light signal with wavelength distortion is converted to phase conjugate light and propagated through a transmission path having the same amount of dispersion and nonlinearity, thereby making it possible to restore the light signal of the original wavelength.

Figure 1:
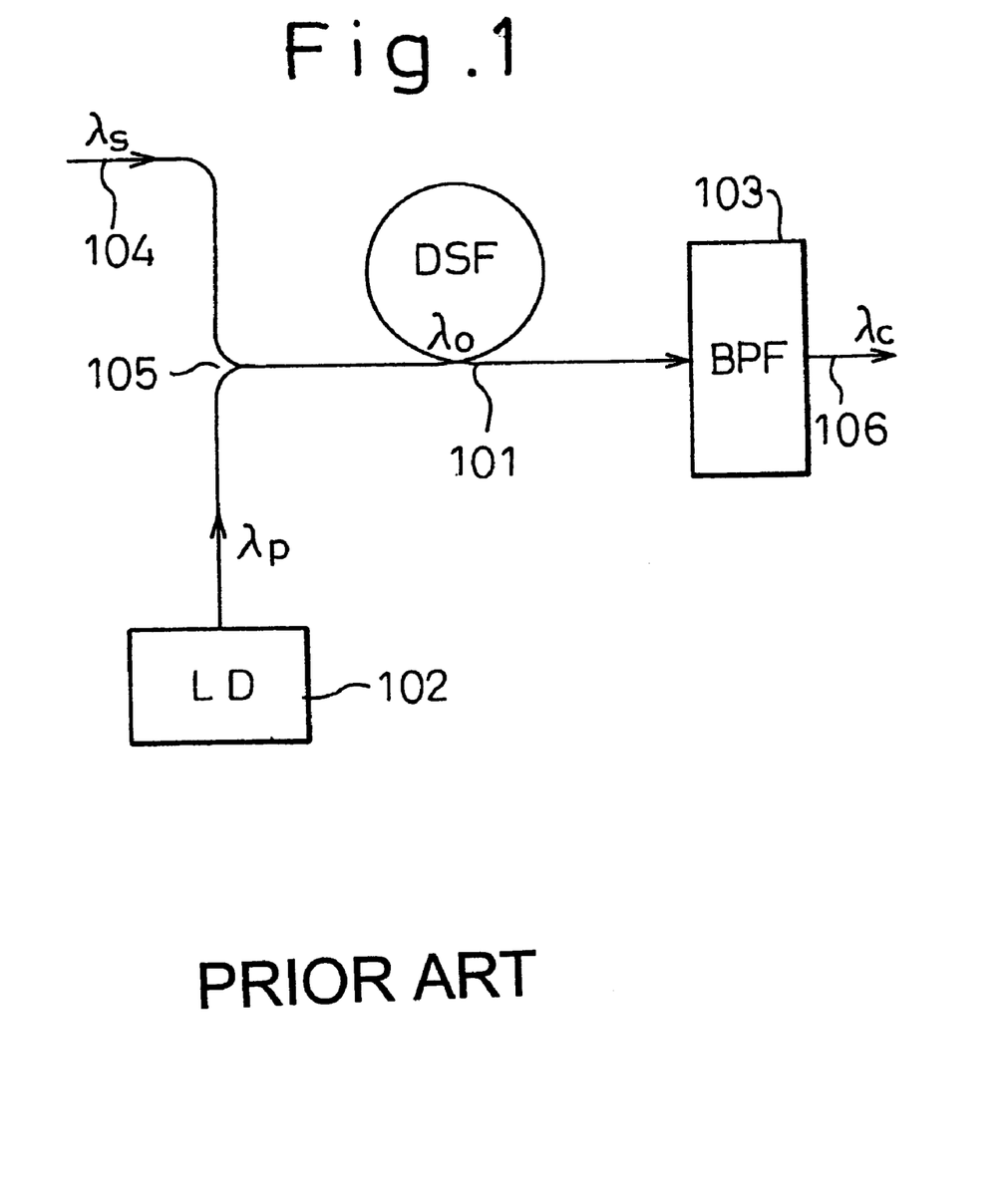
FIG. 1 is a diagram for explaining the prior art.

The configuration of a four light wave mixer using an optical fiber, a semiconductor light amplifier, a distributed optical feedback laser diode or the like is known. A known conventional configuration uses an optical fiber as shown in FIG. 1. In FIG. 1, reference numeral 101 designates a dispersion-shifted optical fiber (DSF) of zero dispersion wavelength $\lambda_0$, numeral 102 a pump light source (LD) for generating the pump light of wavelength $\lambda_p$, numeral 103 an optical bandpass filter (BPF) for passing the band of wavelength $\lambda_c$, numeral 104 an optical fiber for inputting the signal light, numeral 105 a wavelength multiplexing unit for multiplexing the signal light of wavelength $\lambda_s$ with the pump light of wavelength $\lambda_p$ and applying the resulting light into the dispersion-shifted optical fiber 101, and numeral 106 an optical fiber for outputting the converted light.

Assume that the zero dispersion wavelength $\lambda_0$ of the dispersion-shifted optical fiber 101 is equalized with the wavelength $\lambda_p$ of the pump light from the pump light source 102 and that the signal light of wavelength $\lambda_s$ and the pump light of wavelength $\lambda_p$ are applied to the dispersion-shifted optical fiber 101 through the multiplexing unit 105. Then, the light of wavelength $\lambda_s$, $\lambda_p$ containing the converted light of wavelength $\lambda_c (\approx 2\lambda_p - \lambda_s)$ symmetric about the pump light wavelength $\lambda_p$ with respect to the signal light wavelength $\lambda_s$ is output, and the converted light of wavelength $\lambda_c$ can be output by the optical bandpass filter 103. The converted light thus obtained by the four light waves mixing has an intensity proportional to that of the incident signal light and also has a phase proportional to the complex conjugate of the signal light.

For improving the efficiency of four light waves mixing using the optical fiber, the phase matching conditions must be satisfied by rendering the pump light wavelength coincident with the zero dispersion wavelength of the optical fiber. In order to compensate for the variations along the longitudinal direction of the zero dispersion wavelength of the optical fiber, an optical fiber of a predetermined length is segmented and the segmented optical fibers are combined and connected so that a reference zero dispersion wavelength is secured as a whole due to the length of each segmented optical fiber and the difference between the average zero dispersion wavelength and the reference zero dispersion wavelength (See Japanese Unexamined Patent Publication No. 7-84289, for example).

Since the zero dispersion wavelength is unique to the optical fiber, however, the wavelength of the converted light is determined naturally by determining the signal light wavelength, and therefore the wavelength of the converted light lacks the freedom. The probable next choice is to change the wavelength of the pump light. In that case, the wavelength of the pump light is displaced from the zero dispersion wavelength, and the phase matching conditions can no longer be satisfied due to the difference in propagation rate between the pump light and the signal light caused by the dispersion characteristic. Thus, the conversion efficiency is deteriorated, with the result that only a very small change in the wavelength is possible.

SUMMARY OF THE INVENTION

The object of the present invention is to increase the freedom of the wavelength of the converted light.

According to a first aspect of the invention, there is provided a tunable wavelength four light wave mixer in which the signal light and the pump light having the same wavelength as the zero dispersion wavelength of a dispersion-shifted optical fiber are applied to the dispersion-shifted optical fiber thereby to output the light having a converted signal light wavelength, wherein the dispersion-shifted optical fiber is composed of a plurality of sequentially connected dispersion-shifted optical fibers having different zero dispersion wavelengths $\lambda_{01}$, $\lambda_{02}$, the mixer having a pump light source for applying the pump light of the same wavelength $\lambda_p$ of as any one of the different zero dispersion wavelengths and the signal light of the wavelength $\lambda_s$. As a result, the converted light can be output from the optical bandpass filter with the wavelength of $\lambda_{c1}$ or $\lambda_{c2}$.

According to a second aspect of the invention, there is provided a tunable wavelength four light wave mixer further comprising a plurality of pump light sources for outputting the pump light of wavelengths $\lambda_{p1}$, $\lambda_{p2}$ corresponding to a plurality of dispersion-shifted optical fibers of different zero dispersion wavelengths or a pump light source capable of selectively outputting the pump light of wavelength $\lambda_{p1}$, $\lambda_{p2}$.

According to a third aspect of the invention, there is provided a tunable wavelength four light wave mixer further comprising a variable attenuator, a light amplifier, a pump light source for controlling the output power, etc. to equalize the input power of the pump light having the same wavelength as the zero dispersion wavelength for each section of a plurality of dispersion-shifted optical fibers of different zero dispersion wavelengths.

According to a fourth aspect of the invention, there is provided a tunable wavelength four light wave mixer further comprising an oscillator for avoiding the restriction of the pump light input power due to the stimulated Brillouin scattering by frequency-modulating or phase-modulating the pump light.

According to a fifth aspect of the invention, there is provided a tunable wavelength four light wave mixer in which the high nonlinear optical fiber with a smaller core diameter can be used as a dispersion-shifted optical fiber.

According to a sixth aspect of the invention, there is provided a tunable wavelength four light wave mixer further comprising a detection means for detecting the converted light and a control unit for controlling the output power of the pump light source, the pump light input power to the dispersion-shifted optical fiber and the central wavelength of the pass band of the variable optical bandpass filter in such a manner as to secure the same output power of the converted light.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 2:
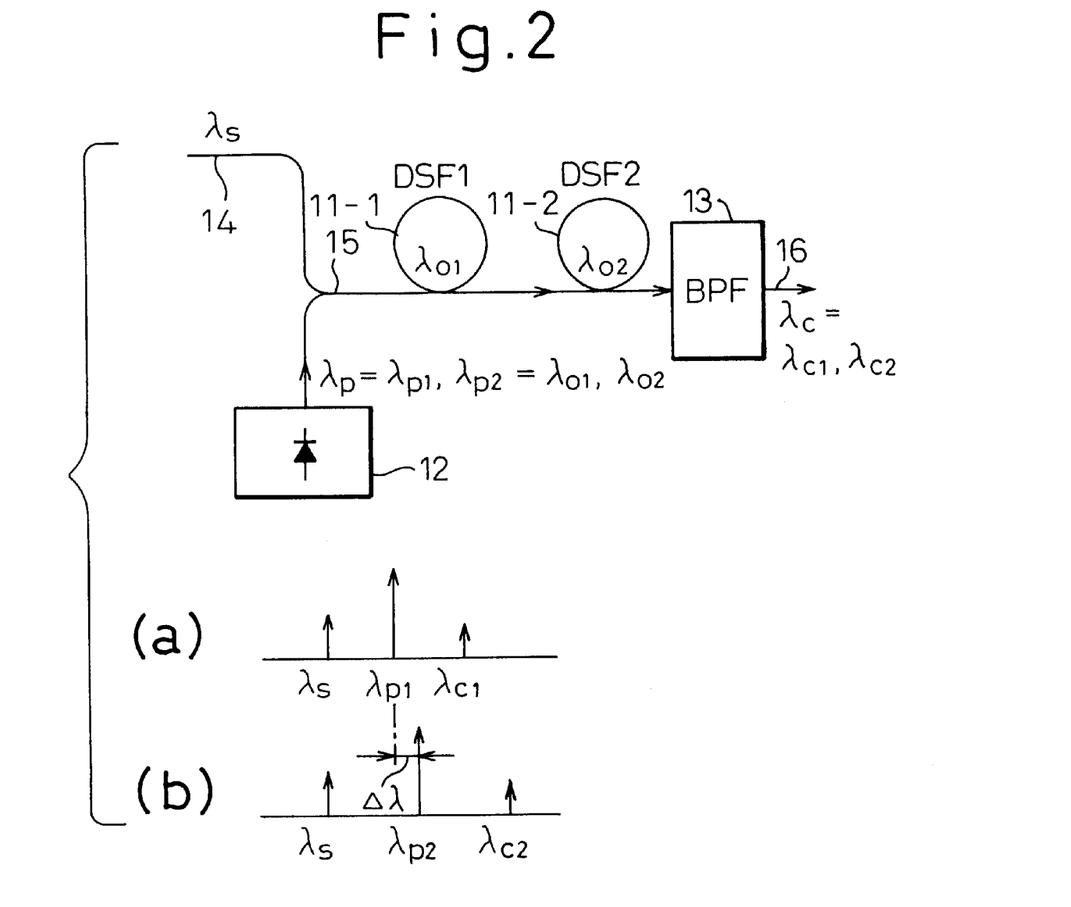
FIG. 2 is a diagram for explaining the principle of the present invention.

FIG. 2 is a diagram for explaining the principle of the invention, in which numerals 11-1, 11-2 designate dispersion-shifted optical fibers (DSF1, DSF2) having the zero dispersion wavelengths $\lambda_{01}$, $\lambda_{02}$, respectively, numeral 12 a pump light source, numeral 13 an optical bandpass filter (BPF), numeral 14 an input optical fiber, numeral 15 a multiplexing unit, and numeral 16 an output optical fiber. A plurality of dispersion-shifted optical fibers 11-1, 11-2 having different zero dispersion wavelengths $\lambda_{01}$, $\lambda_{02}$ are sequentially connected, of which one end is entered by the pump light and the signal light through the multiplexing unit 15, and the converted light of wavelength $\lambda_c$ (=$\lambda_{c1}$, $\lambda_{c2}$) is output through the optical bandpass filter 13 connected to the other end thereof.

The pump light source 12 outputs the pump light of wavelength $\lambda_{p1}$ (=$\lambda_{01}$) or the pump light of wavelength $\lambda_{p2}$ (=$\lambda_{02}$), which pump light is multiplexed with the signal light of wavelength $\lambda_s$ from the input optical fiber 14 in the multiplexing unit 15, and the multiplexed light is applied to one end of a plurality of cascaded dispersion-shifted optical fibers 11-1, 11-2 or, in the case under consideration, one end of the dispersion-shifted optical fiber 11-1.

Assume that, as shown in the lower part (a) of FIG. 2, the incident light is a mixture of the signal light of wavelength $\lambda_s$ and the pump light of the same wavelength $\lambda_{p1}$ as the zero dispersion wavelength $\lambda_{01}$ of the dispersion-shifted optical fiber 11-1. The converted light of wavelength $\lambda_{c1}$ is generated by the four light waves mixing in the dispersion-shifted optical fiber 11-1. Specifically, the converted light of wavelength $\lambda_{c1}$ symmetric with respect to wavelength $\lambda_s$ about wavelength $\lambda_{p1}$ can be output through the optical bandpass filter 13. In the dispersion-shifted optical fiber 11-2, however, the four light wave mixing cannot be realized in view of the fact that the phase matching conditions fail to be met.

In the case where the wavelength of the pump light is the same $\lambda_{p2}$ (=$\lambda_{p1}$+$\Delta\lambda$) as the zero dispersion wavelength $\lambda_{02}$ of the dispersion-shifted optical fiber 11-2, as shown in (b), the converted light of wavelength $\lambda_{c2}$ (=$\lambda_{c1}$+2$\Delta\lambda$) symmetric with respect to wavelength $\lambda_s$ about the wavelength $\lambda_{p2}$ can be output through the optical bandpass filter 13. In view of the fact that the phase matching conditions fail to be met in the dispersion-shifted optical fiber 11-1, however, the four light waves are not mixed. In the dispersion-shifted optical fiber 11-2, on the other hand, the phase matching conditions are satisfied, and therefore the converted light of wavelength $\lambda_{c2}$ is generated by the four light waves mixing. Thus, the signal light of wavelength $\lambda_s$ can be output to an output optical fiber 16 through the bandpass optical filter 13 as a converted light of wavelength $\lambda_{c1}$ or $\lambda_{c2}$.

In this case, the optical bandpass filter 13 can be configured of a variable optical bandpass filter having a pass band of $\lambda_{c1}$, $\lambda_{c2}$ or adapted to switch the pass band in accordance with the switched wavelength of the pump light. Also, by further increasing the types of the dispersion-shifted optical fibers 11-1, 11-2 having different zero dispersion wavelengths and making up a configuration capable of inputting the pump light of wavelength corresponding to the zero dispersion wavelength, the signal light of the wavelength $\lambda_s$ can be converted to the light of any arbitrary wavelength.

Figure 3:
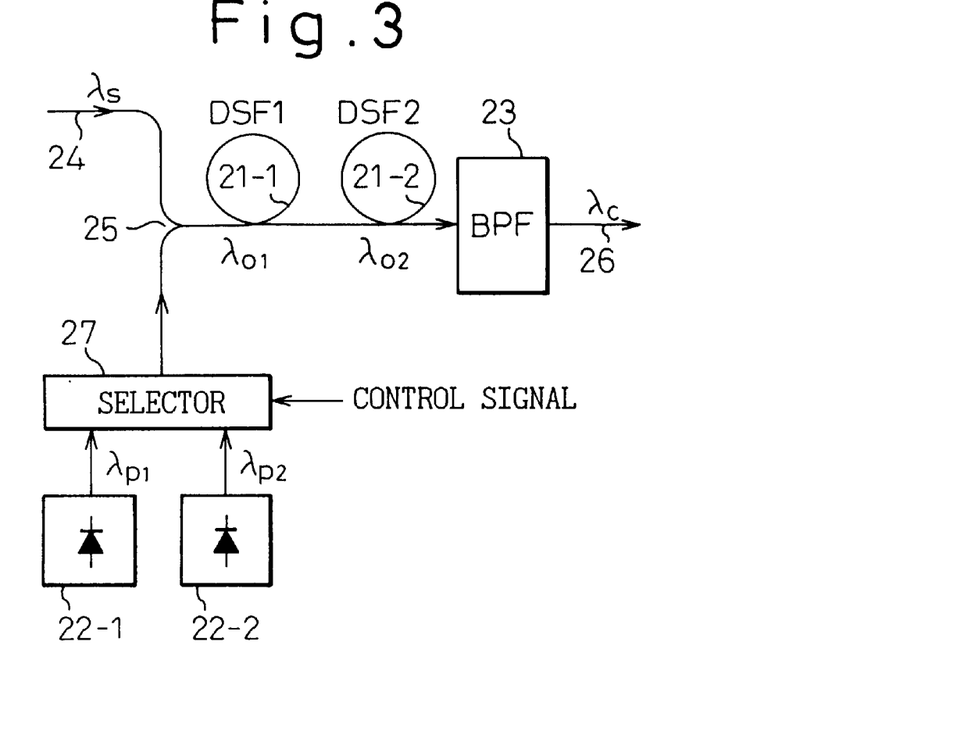
FIG. 3 a diagram for explaining a first embodiment of the invention.

FIG. 3 is a diagram for explaining the first embodiment of the invention, in which numerals 21-1, 21-2 designate dispersion-shifted optical fibers (DSF1, DSF2) having the zero dispersion wavelength of $\lambda_{01}$, $\lambda_{02}$, respectively, numerals 22-1, 22-2 pump light sources, numeral 23 an optical bandpass filter (BPF), numeral 24 an input optical fiber, numeral 25 a wave multiplexing unit, numeral 26 an output optical fiber and numeral 27 a selector.

The basic configuration of this system is the same as the one shown in FIG. 2. Specifically, a plurality of the dispersion-shifted optical fibers 21-1, 21-2 having different zero dispersion wavelengths $\lambda_{01}$, $\lambda_{02}$, respectively, are sequentially connected. The pump light and the signal light are applied to one end of the sequentially connected dispersion-shifted optical fibers, and the converted light of wavelength $\lambda_c$ (=$\lambda_{c1}$, $\lambda_{c2}$) is output through the optical bandpass filter 23 connected to the other end thereof.

This embodiment includes the pump light sources 22-1, 22-2 having the same wavelength as the zero dispersion wavelengths $\lambda_{01}$, $\lambda_{02}$, respectively, of the cascaded dispersion-shifted optical fibers 21-1, 21-2, wherein the pump light sources 22-1, 22-2 of wavelengths $\lambda_{p1}$, $\lambda_{p2}$ are selected by the selector 27 and multiplexed with the signal light of wavelength $\lambda_s$ from the input optical fiber 24 in the multiplexing unit 25 and then input to the dispersion-shifted optical fibers 21-1, 21-2.

Assume, for example, that the pump light of wavelength $\lambda_{p1}$ is selected by the selector 27 and multiplexed with the signal light in the wave multiplexing unit 25 and input to the dispersion-shifted optical fiber 21-1. The light of wavelength $\lambda_{c1}$ converted from the signal light of wavelength $\lambda_s$ and generated by the four light waves mixing in the dispersion-shifted optical fiber 21-1 can be output from the output optical fiber 26 through the optical bandpass filter 23. In this case, the pump light is input to the dispersion-shifted optical fiber 21-2 for the next section through the dispersion-shifted optical fiber 21-1. As described above, however, due to the difference between the zero dispersion wavelength $\lambda_{02}$ and the pump light wavelength $\lambda_{p1}$, the phase matching conditions fail to be met and therefore the four light wave mixing does not occur.

On the other hand, assume that the pump light of wavelength $\lambda_{p2}$ is selected by the selector 27, multiplexed with the signal light in the wave multiplexing unit 25 and input to the dispersion-shifted optical fiber 21-1. As described above, due to the difference between the wavelength $\lambda_{01}$ and the pump light wavelength $\lambda_{p2}$, no mixing of four light waves is caused in the dispersion-shifted optical fiber 21-1. In view of the fact that the zero dispersion wavelength $\lambda_{02}$ of the dispersion-shifted optical fiber 21-2 for the next section is the same as the pump light wavelength $\lambda_{p2}$, however, the converted light of wavelength $\lambda_{c2}$ generated by the four light wave mixing can be output from the output optical fiber 26 through the optical bandpass filter 23. Specifically, by selectively switching the pump light under the control of the selector 27, the signal light of wavelength $\lambda_s$ can be output as a converted light of wavelength $\lambda_{c1}$ or $\lambda_{c2}$.

The selector 27 is configured with well-known various optical switches and adapted to selectively switch the pump light sources 22-1, 22-2 in accordance with the control signal from the control unit not shown. Also, the pump light of different wavelengths can be switched by replacing the selector 27 with a wave multiplexing unit to selectively turn on one of the pump light sources 22-1, 22-2.

Figure 4:
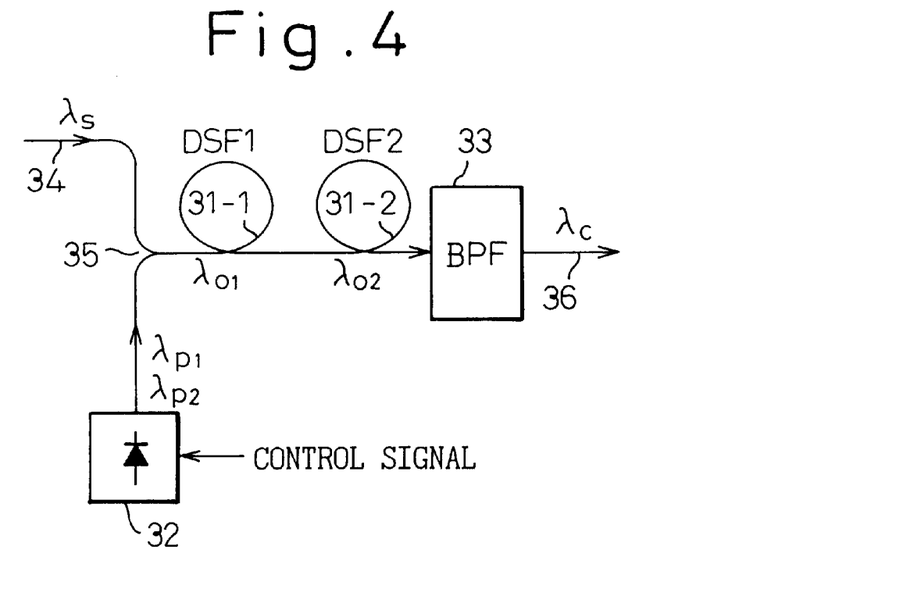
FIG. 4 is a diagram for explaining a second embodiment of the invention.

FIG. 4 is a diagram for explaining the second embodiment of the invention, in which numerals 31-1, 31-2 designate dispersion-shifted optical fibers (DSF1, DSF2) having the zero dispersion wavelengths $\lambda_{01}$, $\lambda_{02}$, respectively, numeral 32 a pump light source, numeral 33 an optical bandpass filter (BPF), numeral 34 an input optical fiber, numeral 35 a wave multiplexing unit, and numeral 36 an output optical fiber, so that the signal light of wavelength $\lambda_s$ is converted and output as the light of wavelength $\lambda_c$ (=$\lambda_{c1}$, $\lambda_{c2}$).

According to this embodiment, the pump light source 32 makes up a variable wavelength light source capable of selectively outputting the pump light of wavelengths $\lambda_{p1}$, $\lambda_{p2}$ in accordance with a control signal. This variable wavelength light source can be a semiconductor laser of various well-known configurations. As an alternative, a wavelength conversion element can be inserted optical or converting the wavelength of the pump light of predetermined wavelength generated.

Assume, for example, that the pump light of wavelength $\lambda_{p1}$ is generated from the pump light source 32 by the control signal and input, together with the signal light of wavelength $\lambda_s$, to the dispersion-shifted optical fibers 31-1, 31-2. The four light wave mixing occurs in the dispersion-shifted optical fiber 31-1 of the same zero dispersion wavelength $\lambda_{01}$ as the wavelength $\lambda_{p1}$ of the pump light, thereby producing the converted light of wavelength $\lambda_{c1}$. In the process, the dispersion-shifted optical fiber 31-2 fails to satisfy the phase matching conditions, and therefore causes no mixing of four light waves. In the case where the pump light of wavelength $\lambda_{p2}$ is generated from the pump light source 32 by the control signal, on the other hand, the mixing of four light waves occurs in the dispersion-shifted optical fiber 31-2 of the same zero dispersion wavelength $\lambda_{c2}$ as the wavelength $\lambda_{p2}$, thereby making it possible to produce the converted light of wavelength $\lambda_{c2}$. In the dispersion-shifted optical fiber 31-1, however, no mixing of four light waves occurs due to the failure to meet the phase matching conditions.

In this way, by selectively switching the wavelength of the pump light from the pump light source 32 between $\lambda_{p1}$ and $\lambda_{p2}$ in accordance with the control signal, the signal light of wavelength $\lambda_s$ can be output from the output optical fiber 36 through the optical bandpass filter 33 as the converted light of wavelength $\lambda_{c1}$ or $\lambda_{c2}$.

Figure 5:
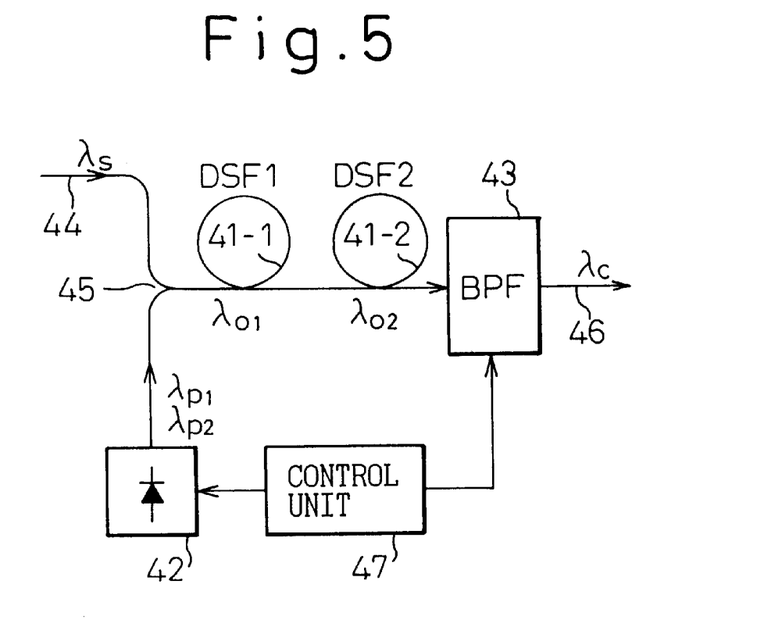
FIG. 5 is a diagram for explaining a third embodiment of the invention.

FIG. 5 is a diagram for explaining the third embodiment of the invention, in which numerals 41-1, 41-2 designate dispersion-shifted optical fibers (DSF1, DSF2) of zero dispersion wavelengths $\lambda_{01}$, $\lambda_{02}$, respectively, numeral a pump light source, numeral 43 an optical bandpass filter (BPF), numeral 44 an input optical fiber, numeral 45 a wave multiplexing unit, numeral 46 an output optical fiber, and numeral 47 a control unit.

As in the preceding embodiments, the signal light of wavelength $\lambda_s$ is converted by the pump light of wavelength $\lambda_{p1}$, $\lambda_{p2}$ and output as converted light of wavelength $\lambda_c$ (=$\lambda_{c1}$, $\lambda_{c2}$). This embodiment represents a configuration including a variable optical bandpass filter for switching the central wavelength of the pass band of the optical bandpass filter 43 by the control signal from the control unit 47 in accordance with the switching of the pump light wavelengths $\lambda_{p1}$, $\lambda_{p2}$. This optical bandpass filter 43 can use any of various known configurations. For example, the bandpass characteristics is changed with the refractive index in response to the control signal.

Assume that the pump light source 42 is controlled by the control unit 47 so that the pump light of wavelength $\lambda_{p1}$ is generated and input through the wave multiplexing unit 45 together with the signal light of wavelength $\lambda_s$, and that the dispersion-shifted optical fiber 41-1 generates the converted light of wavelength $\lambda_{c1}$ by the four light waves mixing. Then, the optical bandpass filter 43 is controlled in such a manner that the wavelength $\lambda_{c1}$ constitutes the central wavelength of the pass band. As a result, the signal light and the pump light can be removed and only the converted light of wavelength $\lambda_{c1}$ can be output from the output optical fiber 46. This embodiment is applicable also to the configuration for selectively switching a plurality of pump light sources with a selector as shown in FIG. 3.

Figure 6:
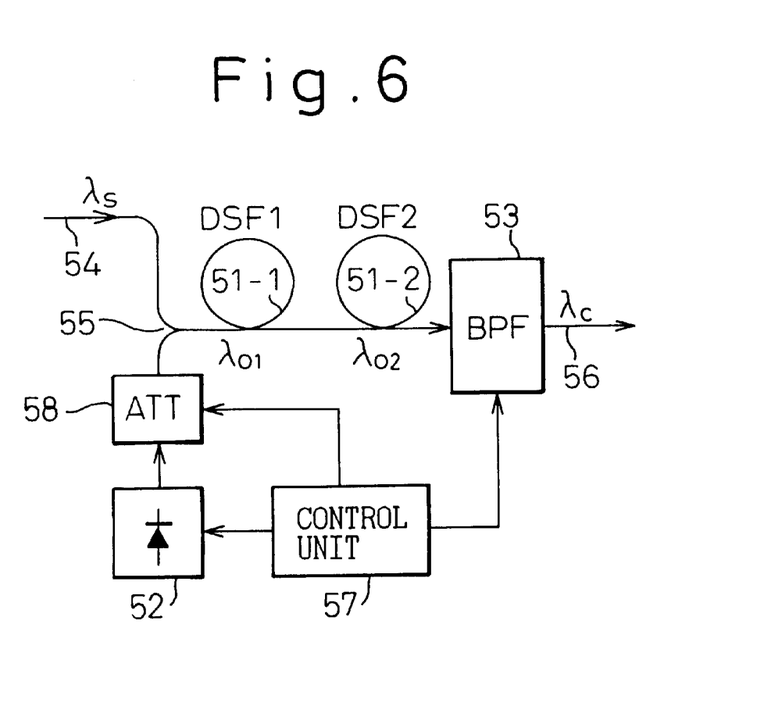
FIG. 6 is a diagram for explaining a fourth embodiment of the invention.

FIG. 6 is a diagram for explaining the fourth embodiment of the invention, in which numerals 51-1, 51-2 designate dispersion-shifted optical fibers (DSF1, DSF2) of zero dispersion wavelengths $\lambda_{01}$, $\lambda_{02}$, respectively, numeral 52 a pump light source, numeral 53 an optical bandpass filter (BPF), numeral 54 an input optical fiber, numeral 55 a wave multiplexing unit, numeral 56 an output optical fiber, numeral 57 a control unit, and numeral 58 a variable attenuator (ATT).

For generating the converted light of certain degree of power, the dispersion-shifted optical fibers 51-1, 51-2 are each required to have the length of at least 10 km. In such a case, as compared with the pump light power input to the dispersion-shifted optical fiber 51-1 for the first section, the pump light power input to the dispersion-shifted optical fiber 51-2 for the second section is attenuated in the first section, and therefore the generation efficiency of the converted light in the second section is reduced as compared with the generation efficiency in the first section.

In view of this, the variable attenuator 58 is controlled in the case where the pump light of the same wavelength $\lambda_{p1}$ as the zero dispersion wavelength $\lambda_{01}$ is input using the dispersion-shifted optical fiber 51-1 for the first section and in the case where the pump light of the same wavelength $\lambda_{p2}$ as the zero dispersion wavelength $\lambda_{02}$ is input using the dispersion-shifted optical fiber 51-2 for the second section.

In this way, the power of the pump light having the wavelength $\lambda_{p1}$ input to the dispersion-shifted optical fiber 51-1 for the first section is rendered substantially equal to the power of the pump light of the wavelength $\lambda_{p2}$ input to the dispersion-shifted optical fiber 51-2 for the second section.

Specifically, in the embodiment shown in FIG. 6, the variable attenuator 58 is inserted between the pump light source 52 and the wave multiplexing unit 55, and the pump light source 52 and the optical bandpass filter 53 configured of a variable optical bandpass filter are controlled by the control unit 57, while at the same time controlling the variable attenuator 58. In the case where the pump light source 52 is controlled by the control unit 57 to generate the pump light of wavelength $\lambda_{p1}$ for the signal light of wavelength $\lambda_s$, for example, the optical bandpass filter 53 is controlled in such a manner that the converted light of wavelength $\lambda_{c1}$ constitutes the central wavelength of the pass band while controlling the variable attenuator 58 in such a manner as to attenuate the power of the pump light corresponding to the loss of the dispersion-shifted optical fiber 51-1 for the first section by use of the variable attenuator 58.

Also, the optical bandpass filter 53 is controlled in such a manner that the converted light of wavelength $\lambda_{c2}$ constitutes the central wavelength of the pass band when the pump light source 52 is controlled to generate the pump light of wavelength $\lambda_{p2}$, and the attenuation amount of the variable attenuator 58 is controlled to zero. As a result, the pump light power of wavelength $\lambda_{p1}$ input to the dispersion-shifted optical fiber 51-1 for the first section is made substantially identical to the pump light power of wavelength $\lambda_{p2}$ input to the dispersion-shifted optical fiber 51-2 for the second section, so that the conversion efficiency for converting the signal light of wavelength $\lambda_s$ into the light of wavelength $\lambda_{c1}$ can be substantially identical to that for converting the signal light of wavelength $\lambda_s$ to the light of wavelength $\lambda$.

Also, as compared with the four light wave mixing using the dispersion-shifted optical fiber 51-1 for the first section, the four light wave mixing using the dispersion-shifted optical fiber 51-2 for the second section is controlled to switch the wavelength of the pump light of the pump light source 52 from $\lambda_{p1}$ to $\lambda_{p2}$. At the same time, the power is increased by controlling the injection current or the like thereby to compensate for the loss of the first section and thus reduce the power difference between the converted light due to the wavelength. In such a case, the variable attenuator 58 can be done without.

The normal dispersion-shifted optical fiber has a core diameter of, say, about 8.5 $\mu$m. By reducing the core diameter to 4.0 $\mu$m or doping it with germanium (Ge) to increase the nonlinear refractive index, the nonlinear effect can be increased. Such a high nonlinear optical fiber can be used. In such a case, the use of the dispersion-shifted optical fiber of normal core diameter requires the length of about 10 km for each section corresponding to the zero dispersion wavelength. In the case where the high nonlinear optical fiber with a reduced core diameter, however, the length of the section can be shortened to about several km. In such a case, it is necessary to reduce the connection loss due to the core diameter difference between the input optical fiber 54 and the output optical fiber 56. By reducing the length of each section, on the other hand, the loss for each section is reduced, thereby reducing the variations of the pump light power between the sections. Thus, the configuration omitting the variable attenuator 58 of FIG. 6 is possible.

Figure 7:
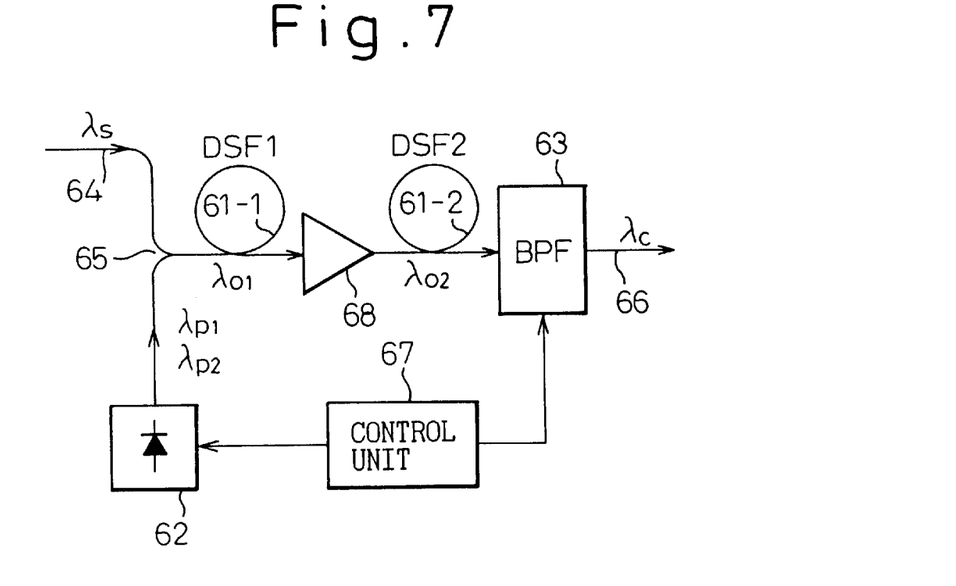
FIG. 7 is a diagram for explaining a fifth embodiment of the invention.

FIG. 7 is a diagram for explaining the fifth embodiment of the invention, in which numerals 61-1, 61-2 designate dispersion-shifted optical fibers (DSF1, DSF2) of zero dispersion wavelengths $\lambda_{01}$, $\lambda_{02}$, respectively, numeral 62 a pump light source, numeral 63 an optical bandpass filter (BPF), numeral 64 an input optical fiber, numeral 66 a wave multiplexing unit, numeral 66 an output optical fiber, numeral 67 a control unit, and numeral 68 an optical amplifier.

In order to substantially equalize the power of the pump light having the same zero dispersion wavelength input to the dispersion-shifted optical fibers of the first and second sections in the preceding embodiments, the optical amplifier 68 is inserted between the dispersion-shifted optical fiber 61-1 for the first section and the dispersion-shifted optical fiber 61-2 for the second section, so that the loss of the dispersion-shifted optical fiber 61-1 for the first section is amplified by the optical amplifier 68 and input to the dispersion-shifted optical fiber 61-2 for the next section. This optical amplifier 68 can be an optical semiconductor amplifier or a dope optical fiber amplifier of the rare earth group.

In the case where the signal light of wavelength $\lambda_s$ is converted into the light of wavelength $\lambda_{c1}$ or $\lambda_{c2}$, the conversion efficiency of the dispersion-shifted optical fiber 61-1 for the first section can be made substantially equal to that of the dispersion-shifted optical fiber 61-2 for the second section, so that the converted light of substantially the same power can be output from the output optical fiber 66 through the optical bandpass filter 63. The operation of converting the signal light of wavelength $\lambda_s$ into the light of wavelengths $\lambda_{c1}$, $\lambda_{c2}$ by the pump light of wavelengths $\lambda_{p1}$, $\lambda_{p2}$ and outputting them through the optical bandpass filter 63 configured as a variable optical bandpass filter for controlling the switching of the central wavelength of the pass band is similar to the corresponding operation in each of the embodiments described above, and therefore will not be explained again.

Figure 8:
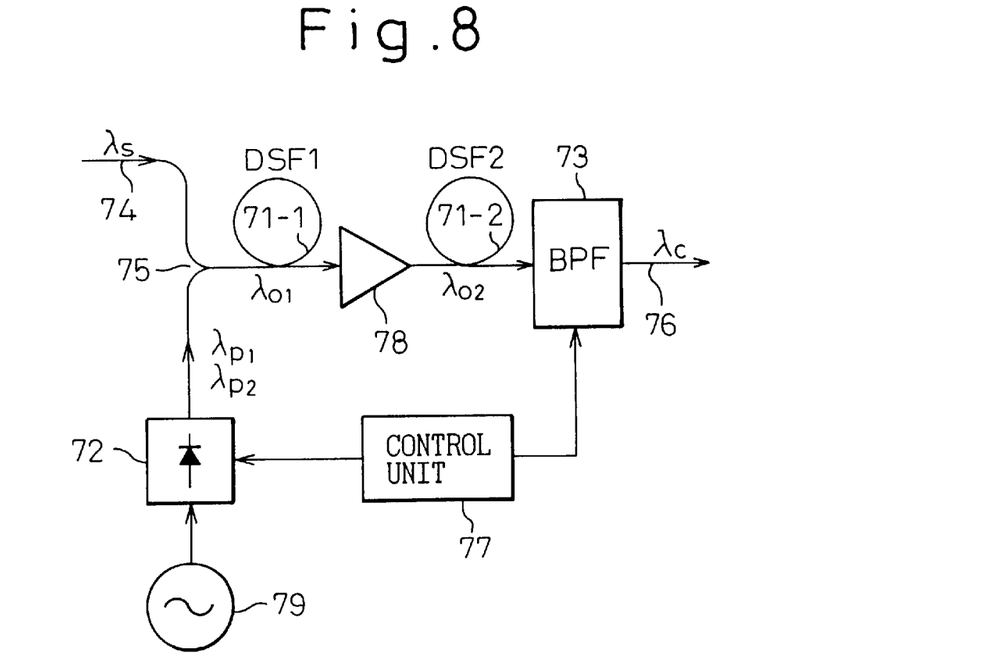
FIG. 8 is a diagram for explaining a sixth embodiment of the invention.

FIG. 8 is a diagram for explaining the sixth embodiment of the invention, in which numerals 71-1, 71-2 designate dispersion-shifted optical fibers (DSF1, DSF2) of zero dispersion wavelengths $\lambda_{01}$, $\lambda_{02}$, numeral 72 a pump light source, numeral 73 an optical bandpass filter (BPF), numeral 74 an input optical fiber, numeral 75 a wave multiplexing unit, numeral 76 an output optical fiber, numeral 77 a control unit, numeral 78 an optical amplifier and numeral 79 an oscillator.

This embodiment has a configuration corresponding to the configuration of the embodiment shown in FIG. 7 with the oscillation 79 added thereto. Generally, for improving the efficiency of generating the converted light, the power of the pump light is increased. In the optical fiber, however, the scattering occurs due to the stimulated Brillouin effect, and therefore the increase in the pump light power has its own limitation. In view of this, the pump light from the pump light source 72 is frequency-modulated or phase-modulated by the oscillator 79 and by thus diffusing the spectrum, the stimulated Brillouin scattering is suppressed. As a result, the pump light power can be increased for an improved generation efficiency of the converted light.

In this case, it is also possible to modulate the injection current of the pump light source 72 including a semiconductor laser by the oscillation output signal of the oscillator 79. With an optical modulator inserted at the output of the pump light source 72, therefore, the pump light can be modulated by the oscillation output signal of the oscillator 79. The operation of converting the signal light of wavelength $\lambda_s$ into the light of wavelengths $\lambda_{c1}$, $\lambda_{c2}$ by the pump light of wavelengths $\lambda_{p1}$, $\lambda_{p2}$ and outputting the resulting signal is similar to the corresponding operation in each of the embodiments described above, and therefore will not be described again.

Figure 9:
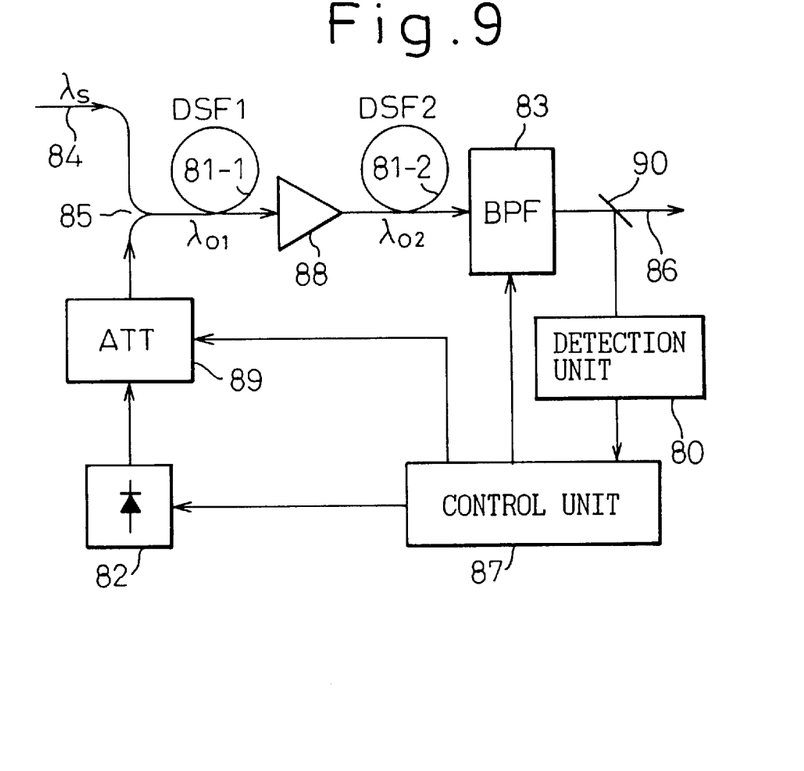
FIG. 9 is a diagram for explaining a seventh embodiment of the invention.

FIG. 9 is a diagram for explaining the seventh embodiment of the invention, in which numeral 80 designates a detection unit, numerals 81-1, 81-2 dispersion-shifted optical fibers (DSF1, DSF2) of zero dispersion wavelengths $\lambda_{o1}$, $\lambda_{o2}$, respectively, numeral 82 a pump light source, numeral 83 an optical bandpass filter (BPF), numeral 84 an input optical fiber, numeral 85 a wave multiplexing unit, numeral 86 an output optical fiber, numeral 87 a control unit, numeral 88 an optical amplifier, numeral 89 a variable attenuator, and numeral 90 a beam splitter.

According to this embodiment, the wavelength of the pump light from the pump light source 82 and the central frequency in the pass band of the optical bandpass filter 83 configured of a variable optical bandpass filter are switched under the control of the control unit 87. At the same time, the attenuation amount of the variable attenuator 89 is controlled by the control unit 87. Part of the converted light output from the optical bandpass filter 83 is split by a beam splitter 90 and input to a detection unit 80 constituting detection means including a photoelectric conversion element such as a photodiode. The detection signal is input to the control unit 87 thereby to determine the power of the converted light. Then, the power and wavelength of the pump light from the pump light source 82, the attenuation amount of the variable attenuator 89 and the central wavelength in the pass band of the optical bandpass filter 83 are controlled by the control unit 87.

In the case where the signal light of wavelength $\lambda_s$ is converted into the light of wavelengths $\lambda_{c1}$, $\lambda_{c2}$, therefore, the power of the converted light is controlled to a maximum thereby making it possible to suppress the power variations due to the wavelength of the converted light. In this case, an operating point can be found by modulating the pump light with a low frequency and extracting the low-frequency component contained in the detection signal obtained from the detection unit 80. As a result, the central wavelength of the pass band of the optical bandpass filter 83 is controlled, the converted light making up the output light of the central frequency is detected by the detection unit 80, and the signal light of wavelength $\lambda_s$ can be output by being converted into the light of the desired wavelengths $\lambda_{c1}$, $\lambda_{c2}$, while controlling the power to a constant value.

As in the preceding embodiments, the loss of the dispersion-shifted optical fiber 81-1 for the first section is compensated for by the optical amplifier 88 so that the conversion efficiency is substantially made the same for the first and second sections, and the pump light power of the variable attenuator 89 is controlled thereby to render the power of the converted light substantially the same for any wavelength. Also, only the converted light of the desired wavelength can be output to the output optical fiber 86 by controlling the central wavelength of the pass band of the optical bandpass filter 83.

Figure 10:
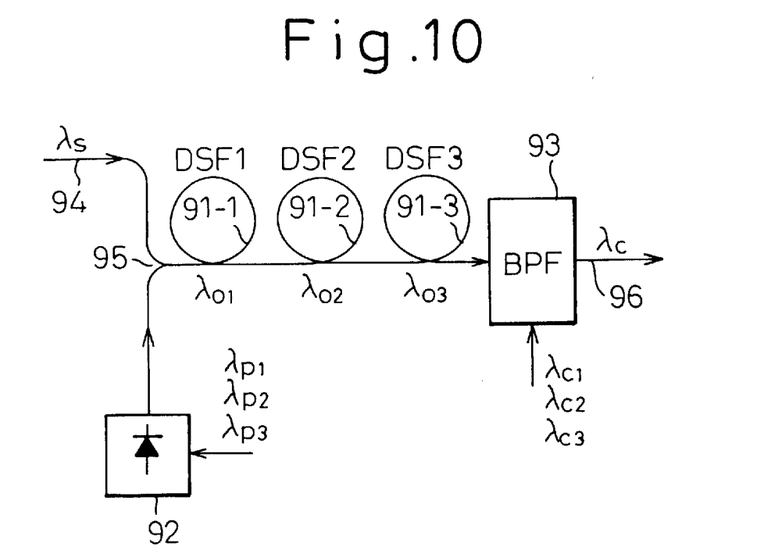
FIG. 10 is a diagram for explaining an eighth embodiment of the invention.

FIG. 10 is a diagram for explaining the eighth embodiment of the invention, in which numerals 91-1, 91-2, 91-3 designate dispersion-shifted optical fibers (DSF1, DSF2, DSF3) of zero dispersion wavelengths $\lambda_{o1}$, $\lambda_{o2}$, $\lambda_{o3}$, respectively, numeral 92 a pump light source, numeral 93 an optical bandpass filter (BPF), numeral 94 an input optical fiber, numeral 95 a wave multiplexing unit and numeral 96 an output optical fiber.

This embodiment represents the case in which the dispersion-shifted optical fibers 91-1 to 91-3 of different zero dispersion wavelengths $\lambda_{o1}$, $\lambda_{o2}$, $\lambda_{o3}$ are connected in the first, second and third sections, respectively. In accordance with this configuration, the pump light source 92 is adapted to output by switching the pump light of wavelengths $\lambda_{p1}$, $\lambda_{p2}$, $\lambda_{p3}$ corresponding to the zero dispersion wavelengths $\lambda_{o1}$, $\lambda_{o2}$, $\lambda_{o3}$, respectively. Also, the optical bandpass filter 93 constituting a variable optical bandpass filter is configured to switch the central wavelengths $\lambda_{c1}$, $\lambda_{c2}$, $\lambda_{c3}$ of the pass band in response to the conversion of the signal light of wavelength $\lambda_s$ to the light of wavelengths $\lambda_{c1}$, $\lambda_{c2}$, $\lambda_{c3}$ corresponding to the pump light through the input optical fiber 94. This switching control permits the wavelength $\lambda_c$ of the converted light to be converted into any one of the wavelengths $\lambda_{c1}$, $\lambda_{c2}$, $\lambda_{c3}$ in accordance with the switching control of the wavelength of the pump light and output from the output optical fiber 96.

The present invention is not confined to the embodiments described above, but is applicable to any combination of the embodiments. The embodiment shown in FIG. 10, for example, may further comprise an optical amplifier inserted between the first and second sections and another optical amplifier between the second and third sections. In this way, the signal can be amplified to compensate for the loss in each section so that the power of the pump light of the wavelength corresponding to each section is substantially the same. Also, a pump light source of variable wavelength can include an optical bandpass filter adapted to switch the central frequency of the pass band in response to the switching of the pump light wavelength.

As described above, according to this invention, dispersion-shifted optical fibers having a plurality of different zero dispersion wavelengths $\lambda_{o1}$, $\lambda_{o2}$ and so forth are sequentially connected, and the pump light of the same wavelength as any one of the zero dispersion wavelengths $\lambda_{o1}$, $\lambda_{o2}$, and so forth is input to one terminal of the dispersion-shifted optical fiber group together with the signal of wavelength $\lambda_s$. By changing the wavelength of the pump light, the converted light of an arbitrary wavelength can be produced. Thus, the converted light of the desired wavelength can be produced by providing a pump light source for outputting the pump light of a corresponding wavelength. Other applicable configurations include the one in which a plurality of pump light sources are provided and can be selected by a selector or the wavelength of the pump light from the pump light source of variable wavelength is controlled by being switched.

Also, the output power of the pump light source and the attenuation of the pump light are controlled and the output light for each section is amplified by an optical amplifier, etc. in such a manner that the input power for the corresponding sections are identical for the pump light having the same zero dispersion wavelength input to the dispersion-shifted optical fiber for each section. In this way, substantially the same conversion efficiency can be secured regardless of the wavelength of the converted light.

Another advantage of the invention is that the stimulated Brilliouin scattering can be suppressed and the pump light power input to the dispersion-shifted optical fiber can be increased by frequency-modulating or phase-modulating the pump light, thus improving the conversion efficiency for converting the signal light into the light of the desired wavelength.

Further, the use of a highly nonlinear optical fiber smaller in core diameter than the normal dispersion-shifted optical fiber can shorten the length of the fiber. This leads to the advantage of a reduced propagation loss of the optical signal and a reduced size of the system. Also, the converted light from a bandpass optical filter is detected by detection means, and the output power of the pump light source, the input power of the pump light to the dispersion-shifted optical fiber, and the central wavelength of the pass band of the optical bandpass filter are controlled. This configuration has the advantage that the power of the converted light of the desired wavelength can be kept constant.

What is claimed is:

1. A tunable wavelength four light wave mixer comprising:
a dispersion-shifted optical fiber including a plurality of sequentially connected dispersion-shifted optical fiber elements, each of the optical fiber elements having a different zero dispersion wavelength;
a pump light source; and
a mixer, wherein the mixer includes the pump light source that applies pump light having a pump light wavelength substantially equal to any one of the different zero dispersion wavelengths of the optical fiber elements, together with a signal light, wherein the signal light is converted to a converted light with a converted light wavelength different from a signal light wavelength.

2. A tunable wavelength four light wave mixer according to claim 1, wherein the pump light source is a plurality of pump light sources, the four wave light mixer further comprising a selector selectively applying the pump light from the plurality of pump light sources to one end of the zero dispersion-shifted optical fiber, wherein the plurality of pump light sources generate a plurality of the pump light having pump light wavelengths, which are substantially equal to a plurality of respective different zero dispersion wavelengths of the dispersion-shifted optical fiber elements.

3. A tunable wavelength four light wave mixer according to claim 1, wherein the pump light source is a variable wavelength pump light source generating by selective control the pump light having respective pump light wavelengths, which are substantially equal to respective different zero dispersion wavelengths of the plurality of the dispersion-shifted optical fiber elements.

4. A tunable wavelength four light wave mixer according to claim 1, further comprising a variable wavelength optical bandpass filter passing only the light of the wavelength converted from the wavelength of said signal light, said variable wavelength bandpass filter being supplied with the pump light, which has the pump light wavelength substantially equal to one of said different zero dispersion wavelengths of the optical fiber elements, together with the signal light from one end of said dispersion-shifted optical fiber for passing only the light converted from the wavelength of said signal light.

5. A tunable wavelength four light wave mixer according to claim 1, wherein the pump light source controls the output power such that the pump light having respective pump light wavelengths, which are substantially equal to respective different zero dispersion wavelengths of the plurality of the dispersion-shifted optical fiber elements, have substantially a same input power for each of the respective pump light wavelengths.

6. A tunable wavelength four light wave mixer according to claim 1, further comprising an optical amplifier amplifying an output light of each of the dispersion-shifted optical fiber elements such that the pump light having respective pump light wavelengths, which are substantially equal to respective different zero dispersion wavelengths of the dispersion-shifted optical fiber elements, have substantially a same input power for each of the respective pump light wavelengths.

7. A tunable wavelength four light wave mixer according to claim 1, further comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

8. A tunable wavelength four light wave mixer according to claim 1, wherein said dispersion-shifted optical fiber includes a high nonlinear optical fiber with a smaller core diameter and a larger nonlinear effect.

9. A tunable wavelength four light wave mixer according to claim 1, further comprising a detection unit detecting the converted light and a control unit for controlling the wavelength and power of the pump light and a central wavelength of a variable wavelength optical bandpass filter such that the converted light from said detection unit is kept constant.

10. A tunable wavelength four light wave mixer according to claim 2, further comprising a variable wavelength optical bandpass filter passing only the light of the wavelength converted from the wavelength of said signal light, said variable wavelength bandpass filter being supplied with the pump light, which has the pump light wavelength substantially equal to one of said different zero dispersion wavelengths of the optical fiber elements, together with the signal light from one end of said dispersion-shifted optical fiber for passing only the light converted from the wavelength of said signal light.

11. A tunable wavelength four light wave mixer according to claim 3, further comprising a variable wavelength optical bandpass filter passing only the light of the wavelength converted from the wavelength of said signal light, said variable wavelength bandpass filter being supplied with the pump light, which has the pump light wavelength substantially equal to one of said different zero dispersion wavelengths of the optical fiber elements, together with the signal light from one end of said dispersion-shifted optical fiber for passing only the light converted from the wavelength of said signal light.

12. A tunable wavelength four light wave mixer according to claim 2, wherein the pump light source controls the output power such that the pump light having respective pump light wavelengths, which are substantially equal to respective different zero dispersion wavelengths of the plurality of the dispersion-shifted optical fiber elements, have substantially a same input power for each of the respective light wavelengths.

13. A tunable wavelength four light wave mixer according to claim 3, wherein the pump light source controls the output power such that the pump light having respective pump light wavelengths, which are substantially equal to respective different zero dispersion wavelengths of the plurality of the dispersion-shifted optical fiber elements, have substantially a same input power for each of the respective light wavelengths.

14. A tunable wavelength four light wave mixer according to claim 4, wherein the pump light source controls the output power such that the pump light having respective pump light wavelengths, which are substantially equal to respective different zero dispersion wavelengths of the plurality of the dispersion-shifted optical fiber elements, have substantially a same input power for each of the respective light wavelengths.

15. A tunable wavelength four light wave mixer according to claim 2, further comprising an optical amplifier amplifying an output light of each of the dispersion-shifted optical fiber elements such that the pump light having respective pump light wavelengths, which are substantially equal to respective different zero dispersion wavelengths of the dispersion-shifted optical fiber elements, have substantially a same input power for each of the respective pump light wavelengths.

16. A tunable wavelength four light wave mixer according to claim 3, further comprising an optical amplifier amplifying an output light of each of the dispersion-shifted optical fiber elements such that the pump light having respective pump light wavelengths, which are substantially equal to respective different zero dispersion wavelengths of the dispersion-shifted optical fiber elements, have substantially a same input power for each of the respective pump light wavelengths.

17. A tunable wavelength four light wave mixer according to claim 4, further comprising an optical amplifier amplifying an output light of each of the dispersion-shifted optical fiber elements such that the pump light having respective pump light wavelengths, which are substantially equal to respective different zero dispersion wavelengths of the dispersion-shifted optical fiber elements, have substantially a same input power for each of the respective pump light wavelengths.

18. A tunable wavelength four light wave mixer according to claim 2, comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

19. A tunable wavelength four light wave mixer according to claim 3, comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

20. A tunable wavelength four light wave mixer according to claim 4, comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

21. A tunable wavelength four light wave mixer according to claim 5, comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

22. A tunable wavelength four light wave mixer according to claim 6, comprising an oscillator frequency-modulating or phase-modulating the pump light of the pump light source for suppressing a stimulated Brillouin scattering,
wherein the pump light source, which is supplied with the signal light together with the pump light having a pump light wavelength substantially equal to any one of the different zero dispersion wavelengths of the optical fiber elements, is supplied from an end of an optical fiber group.

23. A tunable wavelength four light wave mixer according to claim 2, wherein said dispersion-shifted optical fiber includes a high nonlinear optical fiber with a smaller core diameter and a larger nonlinear effect.

24. A tunable wavelength four light wave mixer according to claim 3, wherein said dispersion-shifted optical fiber includes a high nonlinear optical fiber with a smaller core diameter and a larger nonlinear effect.

25. A tunable wavelength four light wave mixer according to claim 4, wherein said dispersion-shifted optical fiber includes a high nonlinear optical fiber with a smaller core diameter and a larger nonlinear effect.

26. A tunable wavelength four light wave mixer according to claim 5, wherein said dispersion-shifted optical fiber includes a high nonlinear optical fiber with a smaller core diameter and a larger nonlinear effect.

27. A tunable wavelength four light wave mixer according to claim 6, wherein said dispersion-shifted optical fiber includes a high nonlinear optical fiber with a smaller core diameter and a larger nonlinear effect.

28. A tunable wavelength four light wave mixer according to claim 7, wherein said dispersion-shifted optical fiber includes a high nonlinear optical fiber with a smaller core diameter and a larger nonlinear effect.

29. A tunable wavelength four light wave mixer according to claim 2, further comprising a detection unit detecting the converted light and a control unit controlling the wavelength and power of the pump light and a central wavelength of a variable wavelength optical bandpass filter such that the converted light from said detection unit is kept constant.

30. A tunable wavelength four light wave mixer according to claim 3, further comprising a detection unit detecting the converted light and a control unit controlling the wavelength and power of the pump light and a central wavelength of a variable wavelength optical bandpass filter such that the converted light from said detection unit is kept constant.

31. A tunable wavelength four light wave mixer according to claim 4, further comprising a detection unit detecting the converted light and a control unit controlling the wavelength and power of the pump light and a central wavelength of the variable wavelength optical bandpass filter such that the converted light from said detection unit is kept constant.

32. A tunable wavelength four light wave mixer according to claim 5, further comprising a detection unit detecting the converted light and a control unit controlling the wavelength and power of the pump light and a central wavelength of a variable wavelength optical bandpass filter such that the converted light from said detection unit is kept constant.

33. A tunable wavelength four light wave mixer according to claim 6, further comprising a detection unit detecting the converted light and a control unit controlling the wavelength and power of the pump light and a central wavelength of a variable wavelength optical bandpass filter such that the converted light from said detection unit is kept constant.

34. A tunable wavelength four light wave mixer according to claim 7, further comprising a detection unit detecting the converted light and a control unit controlling the wavelength and power of the pump light and a central wavelength of a variable wavelength optical bandpass filter such that the converted light from said detection unit is kept constant.

35. A tunable wavelength four light wave mixer according to claim 8, further comprising a detection unit detecting the converted light and a control unit controlling the wavelength and power of the pump light and a central wavelength of a variable wavelength optical bandpass filter such that the converted light from said detection unit is kept constant.

\* \* \* \* \*